United States Patent [19]

Holloway et al.

[11] Patent Number: 5,189,819

[45] Date of Patent: Mar. 2, 1993

[54] TRENCHING APPARATUS

[75] Inventors: Randy J. Holloway; Bruce E. Moore; Ronald R. Shinn, all of Lubbock, Tex.

[73] Assignee: Eagle-Picher Industries, Inc., Cincinnati, Ohio

[21] Appl. No.: 696,873

[22] Filed: May 8, 1991

[51] Int. Cl.$^5$ ............................................. E02F 5/06
[52] U.S. Cl. .................................... 37/87; 37/80 R; 37/191 A; 305/39; 305/56
[58] Field of Search .................... 305/39, 56, 60, 16, 305/15, 10; 180/9.48; 37/80 R, 83, 87, 191 R, 191 A, 192 R, 192 A

[56] References Cited

U.S. PATENT DOCUMENTS

| | | |
|---|---|---|
| 606,987 | 7/1898 | Clark . |
| 1,306,350 | 6/1919 | McIntire . |
| 1,710,116 | 4/1929 | Sembera ....................... 37/80 R X |
| 1,769,074 | 7/1930 | Ruatti . |
| 1,850,363 | 3/1932 | Vaughn . |
| 1,850,412 | 3/1932 | Paulik ........................... 37/80 R X |
| 2,681,231 | 6/1954 | Kondracki ..................... 37/80 R X |
| 2,714,262 | 8/1955 | Malzahn . |
| 3,032,899 | 5/1962 | Brinson, Sr. . |
| 3,054,198 | 9/1962 | George et al. ............... 37/191 A X |
| 3,425,572 | 2/1969 | Brach . |
| 3,787,989 | 1/1974 | Heckathorn . |
| 3,951,459 | 4/1976 | Honeycutt, Jr. . |
| 4,043,135 | 8/1977 | Hoes et al. . |
| 4,255,883 | 3/1981 | Ealy . |
| 4,681,483 | 7/1987 | Camilleri . |
| 4,843,742 | 7/1989 | Camelleri ..................... 37/192 A X |

Primary Examiner—Randolph A. Reese
Assistant Examiner—J. Russell McBee
Attorney, Agent, or Firm—Wood, Herron & Evans

[57] ABSTRACT

A trenching apparatus is provided having a base support which mounts a boom structure carrying a digger arm operative to form a trench alongside the base support along a trenching line. The base support includes a pair of longitudinally spaced sleeve members connected to a first track assembly which slidably receive a pair of longitudinally spaced slider members connected to a second, wider track assembly. An adjustment mechanism is provided to move the slider members, and, in turn, the second track assembly, laterally within the sleeve members between a retracted, transport position in which the first and second track assemblies are spaced relatively close to one another and readily fit upon a trailer commonly used to transport heavy equipment along roads and highways, and an extended, operating position in which the first and second track assemblies are relatively widely spaced from one another to provide the apparatus with acceptable stability during a trenching operation.

9 Claims, 2 Drawing Sheets

TRENCHING APPARATUS

FIELD OF THE INVENTION

This invention relates to apparatus for forming trenches, and, more particularly, to an apparatus for digging a longitudinally extending trench suitable for the formation of an inground retaining wall at an excavation site.

BACKGROUND OF THE INVENTION

The erection of above-ground structures, particularly in relatively sandy soil, often requires the formation of inground retaining walls for use as a load-bearing foundation or as barrier to prevent the collapse of soil into the excavated area. Where such excavations are made adjacent an existing structure, the retaining wall along the excavation line adjacent the existing structure is necessary to resist soil pressures established beneath the adjoining structure. If no retaining wall is formed, the soil beneath the adjoining structure can collapse outwardly into the excavation and/or damage the existing structure. In addition to retention of soil, retaining walls of this type are often constructed to block the flow of ground water into the excavated area.

A number of methods have been employed to form retaining walls around an excavation site or adjacent structures which adjoin such site. One method has been to employ piles formed of wood or steel which are driven along the excavation line to form the retaining wall. Alternatively, a roll of bored holes are formed along the excavation line which receive reinforced concrete piles to form the retaining wall. Both of these methods produce retaining walls which are not watertight, and which may require substantial horizontal strengthening to maintain the desired alignment along the excavation line.

Trenching apparatus such as disclosed in Camelleri U.S. Pat. No. 4,843,742 have been proposed as an alternative to the methods and apparatus of forming retaining walls mentioned above. In trenching apparatus of this type, a supporting base capable of being moved in a longitudinal direction along an excavation line carries an elongated trench digger arm supported on one side thereof by a boom structure. The support base is drivingly connected to skids or track assemblies of the type employed in conventional bulldozers which are effective to move the support base and digger arm along the trench line to form a trench of the desired depth. Concrete is poured into the trench immediately behind the moving trenching apparatus, into which appropriate reinforcing bars are inserted, so that an essentially continuously formed, reinforced concrete retaining wall is provided at the excavation site.

One problem with trenching apparatus of the type described in U.S. Pat. No. 4,843,742, particularly in retrenching operations performed in sandy soils, involves cave-in of the trench as it is being formed. The boom structure mounted to the support base carries the heavy digger arm alongside the support base, thus creating a substantial force on the skid or track assembly located closest to the trench. It has been found that the pressure exerted by such track assembly can cause the adjacent soil to cave into the trench at the same time or immediately after the trench is dug.

A second problem with trenching apparatus of the type disclosed in U.S. Pat. No. 4,843,742 is instability during a trenching operation. Because the digger arm is heavy, unless the track assemblies mounted on opposite sides of the support base have substantial lateral spacing therebetween, the apparatus tends to tip over. The extent of lateral spacing between the track assemblies is limited, however, because the trenching apparatus must be narrow enough to load onto conventional trailers for transport on roads and highways. There has therefore been a need to provide a trenching apparatus having acceptable stability, but which can also be readily transported on commercially available trailers or other heavy equipment hauling devices.

SUMMARY OF THE INVENTION

It is therefore among the objectives of this invention to provide a trenching apparatus for digging a longitudinally extending trench along a trench line which substantially eliminates cave-in of the trench as it is being formed, which has acceptable stability during operation and which is readily transported over roads and highways using conventional heavy equipment trailers.

These objectives are accomplished in a trenching apparatus having a base support which mounts a boom structure carrying a digger arm operative to form a trench alongside the base support following a trenching line. The base support includes a pair of longitudinally spaced sleeve members connected to one crawler or track assembly, and a pair of longitudinally spaced slider members connected to a second crawler or track assembly. Each of the slider members is slidably received within a sleeve member to permit relative movement therebetween. An adjustment mechanism, such as one or more cylinders, is effective to move the slider members, and, in turn, the second track assembly, laterally within the sleeve members between a retracted, transport position and an extended, operating position. In the retracted, transport position, the first and second track assemblies are spaced relatively close to one another and readily fit upon a trailer commonly used to transport heavy equipment along roads and highways. In the extended, operating position, the first and second track assemblies are relatively widely spaced from one another providing the apparatus with acceptable stability to perform a trenching operation.

In the presently preferred embodiment, each sleeve member of the support base comprises a rectangular-shaped frame connected at one end to the first track assembly and having an open second end. Preferably, wear plates formed of a low friction, wear resistant plastic or similar material line the interior of each sleeve member to reduce wear and facilitate movement of the slider members therein. Each slider member is formed in a correspondingly shaped rectangular configuration having one end attached to the second track assembly and an opposite end insertable through the open end of a sleeve member and into the interior thereof. In response to operation of the adjustment cylinders, the slider members and second track assembly connected thereto are moved inwardly and outwardly relative to the sleeve members to vary the lateral spacing between the first and second track assemblies from a retracted, transport distance of about 9.7 feet to an extended, operating distance of about 12.5 feet.

Each of the track assemblies are of the same type commonly employed in bulldozers and other types of heavy construction equipment. But the grouser plates forming the outermost, earth-engaging surface of the first track assembly of this invention are preferably about 20 inches in width, whereas the grouser plates forming the outermost surface of the second track assembly are preferably about 36 inches in width. The wider, second track assembly is located on the side of the support base closest to the trench, i.e., on the same side where the boom structure carries the digger arm. These wider grouser plates distribute the force exerted by the weight of the boom structure and digger arm over a comparatively large surface area thus reducing the pressure on the soil beneath. As a result, the problem of cave-in of soil immediately surrounding the trench being dug is substantially reduced.

DESCRIPTION OF THE DRAWINGS

The structure, operation and advantages of the presently preferred embodiment of this invention will become further apparent upon consideration of the following description taken in conjunction with the accompanying drawings wherein.

DETAILED DESCRIPTION OF THE INVENTION

Figure 1:
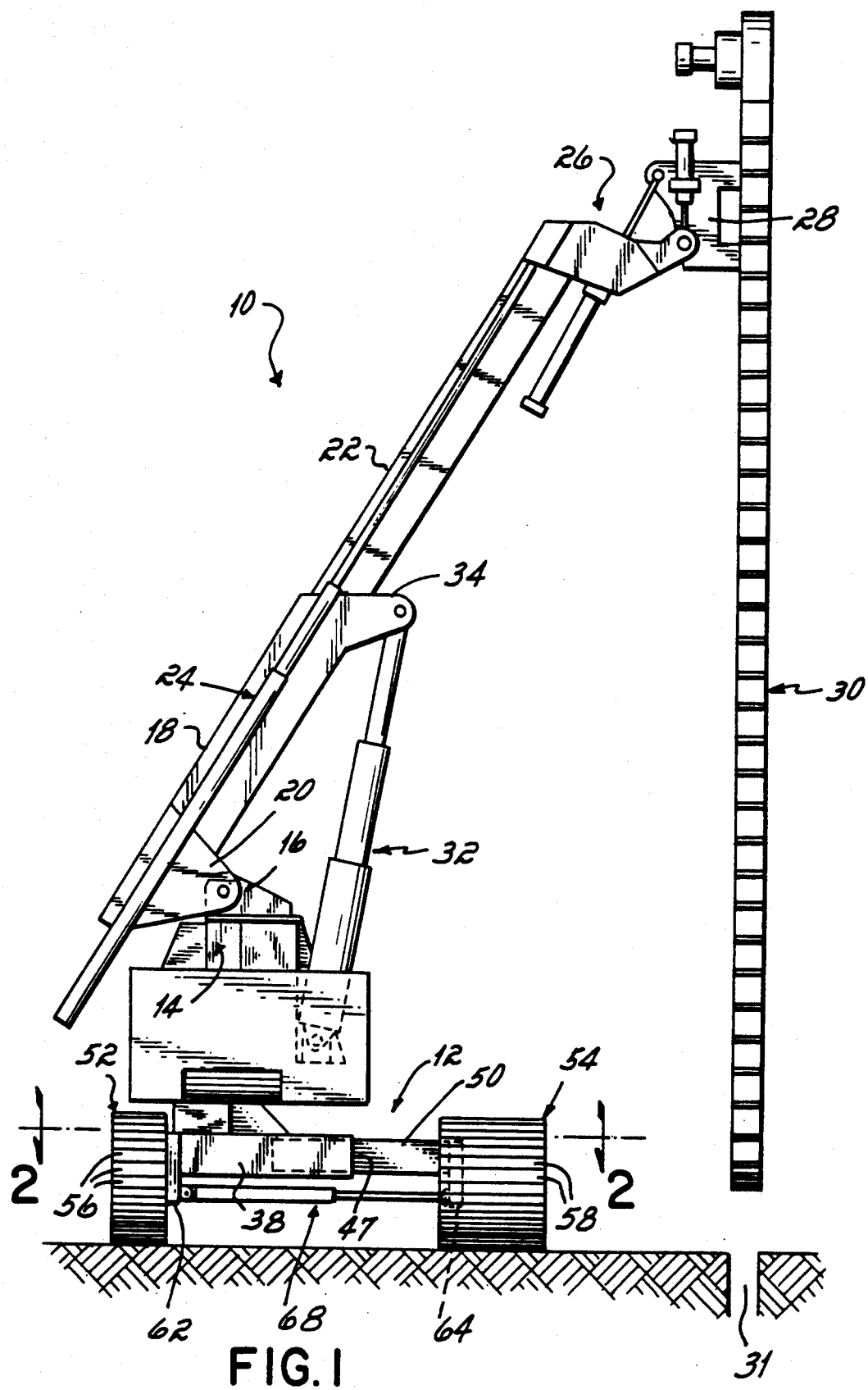
FIG. 1 is a schematic view of a trenching apparatus incorporating the support base of this invention.

Referring now to the Figs., the apparatus 10 comprises a support base 12 which mounts a fixed hitch 14 connected to a pivotal hinge 16. An outer boom 18 is pivotally mounted to the hinge 16 by a bracket 20 and this outer boom 18 slidably receives an inner boom 22. One end of the inner boom 22 is connected to a boom extension cylinder 24 which mounts a digger arm manipulator head 26 having a bracket 28 carrying a digger arm 30. The digger arm 30 is operative to form a trench 31 in a manner such as disclosed in Camelleri U.S. Pat. No. 4,843,742. A lift cylinder 32 is connected by a bracket 34 to the outer boom 18 and is effective to angularly raise and lower the outer boom 18, which, in turn, raises and lowers the digger arm 30. The foregoing construction of apparatus 10 forms no part of this invention of itself and is therefore discussed only briefly herein for purposes of defining the overall construction of apparatus 10.

Figure 2:
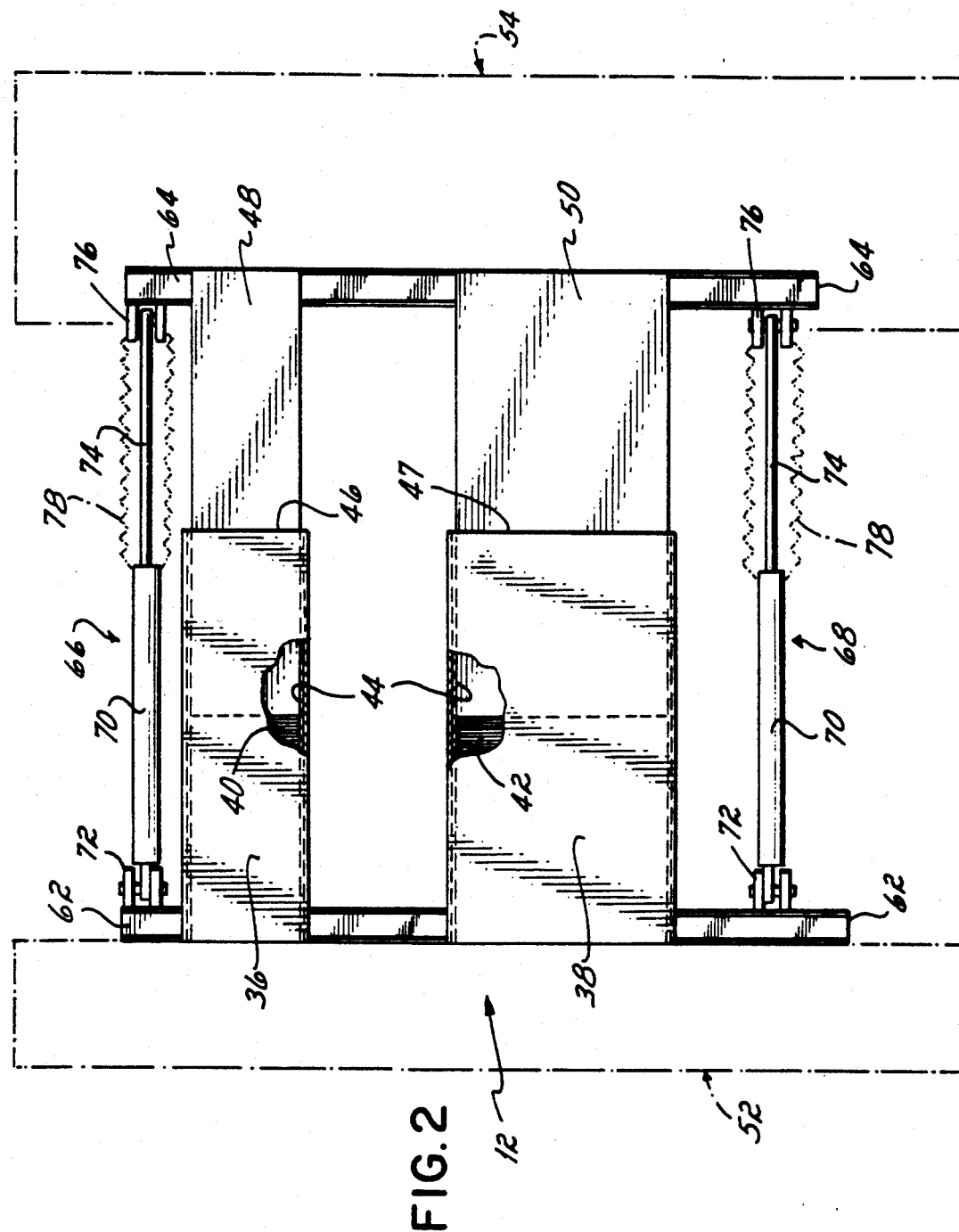
FIG. 2 is a schematic, cross sectional view taken generally along line 2—2 of FIG. 1.

With reference to the bottom of FIG. 1 and FIG. 2, the support base 12 includes a pair of sleeve members 36 and 38. Each of the sleeve members 36, 38 are rectangular in shape having hollow interiors 40 and 42, respectively, lined with wear pads 44 preferably formed of any suitable low friction, wear resistant material such as Nylatron which is a registered trademark of The Polymer Company.

The sleeve member 36 has an open end 46 which is adapted to receive a slider member 48. The slider member 48 is a rectangular-shaped member having an exterior dimension which is slightly less than the interior dimension of the sleeve member 36 including its wear plates 44. Similarly, a second slider member 50 is insertable through the open end 47 and into the interior 42 of sleeve member 38. The second slider member 50 has a rectangular-shaped, exterior surface having a slightly smaller dimension than the interior 42 of sleeve member 38 and the wear plates 44 therein. As shown in FIG. 2, the sleeve member 38 and slider member 50 are larger in width, i.e., from top to bottom as depicted in FIG. 2, than the sleeve member 36 and slider member 48, respectively.

In the presently preferred embodiment, the sleeve members 36, 38 and slider members 48, 50 extend between a first track assembly 52 and a second track assembly 54. The first and second track assemblies 52, 54 are of the type conventionally utilized in excavation machinery such as bulldozers and the like, each including drive rollers and sprockets (not shown), and exterior, earth-contacting grouser plates 56 and 58, respectively. The details of the construction of track assemblies 52, 54 form no part of this invention and are not disclosed herein. For purposes of the present discussion, the first track assembly 52 carries a longitudinally extending beam 62 which fixedly mounts one end of each of the sleeve members 36 and 38 opposite their open ends 46 and 47, respectively. Similarly, the second track assembly 54 mounts a longitudinally extending beam 64 which fixedly mounts one end of each of the slider members 48, 50. As mentioned above, the opposite ends of such slider members 48, 50 are received within the sleeve members 36, 38, respectively.

As viewed in the Figs., the width of the grouser plates 56 forming the outermost, earth-engaging surface of first track assembly 52 are preferably about 20 inches in width. The grouser plates 58 forming the outermost surface of second track assembly 54 are preferably about 36 inches in width. This difference in width is advantageous because the second track assembly 54 is located on the side of apparatus 10 along which the digger arm 30 is carried by booms 18, 22 to dig the trench 31. The weight of booms 18, 22, coupled with the weight of digger arm 30, create a moment or force about the support base 12 tending to tip the apparatus 10 in a clockwise direction as viewed in FIG. 1 which is only partially offset by counterweights (not shown) mounted adjacent track assembly 52. Additionally, substantial retraction forces can be generated in the clockwise direction in the course of pulling the digger arm 30 out of trench 31 if it becomes stuck or its motion restricted. In either instance, a substantial force is exerted on the second track assembly 54 which, in turn, exerts pressure on the ground beneath. An important feature of this invention is that the relatively wide grouse plates 58 of second track assembly 54 distributes this downward force or pressure over a wider area of the earth adjacent the trench 31 formed by the digger arm 30. This prevents or substantially reduces the problem of cave-in of the earth into the trench 31 as it is being formed by the digger arm 30. Additionally, the relatively wide second track assembly 54 enhances the stability of apparatus 10 in resisting a tendency of the apparatus 10 to tilt in a clockwise direction as viewed in FIG. 1.

Another aspect of this invention which enhances the stability of apparatus 10 is provided by the cooperating sleeve members 36, 38 and slider members 48, 50. In the presently preferred embodiment, a pair of longitudinally spaced, pneumatically or hydraulically operated cylinders 66 and 68 are connected between the beams 62 and 64 carried by the track assemblies 52 and 54, respectively. The cylinder housing 70 of each cylinder 66, 68 is mounted by a bracket 72 to the beam 62, and the cylinder rod 74 of each cylinder 66, 68 is mounted by a bracket 76 to the beam 64. These cylinder rods 74 are preferably enclosed in a protective cover or bellows 78 as schematically illustrated in FIG. 2.

In response to operation of the cylinders 66, 68, the slider members 48, 50 are moved laterally within the sleeve members 36, 38, respectively. In turn, the second track assembly 54 is moved laterally relative to the first track assembly 52 between a retracted, transport position (not shown) and an extended, operating position. In the retracted, transport position, the slider members 48, 50 are substantially contained within the sleeve members 36, 38, thus moving the second track assembly 54 to a distance of about 9.7 feet from the first track assembly 52. With the first and second track assemblies 52, 54 in this retracted, transport position, the apparatus 10 is easily loaded onto a trailer for transport along conventional roads and highways. In the extended, operating position, the slider members 48, 50 are moved outwardly from the sleeve members 36, 38 so that the lateral space between the first and second track assemblies 52, 54 is approximately 12.5 feet. In this extended position, the track assemblies 52, 54 provide good stability during operation of the apparatus 10 and resist tilting or pivoting in a clockwise direction under the weight of the booms 18, 22 and digger arm 30.

While the invention has been described with reference to a preferred embodiment, it should be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

For example, the sleeve members 36, 38 and slider members 48, 50 have been illustrated with a rectangular cross section but it should be understood that essentially any configuration could be utilized, e.g., round, square, hexagonal, etc., so long as sliding movement is permitted therebetween. Additionally, other actuators for moving the track assembly 54 relative to track assembly 52 can be used besides cylinders 66, 68 such as racks, cables, etc.

Therefore, it is intended that the invention not be limited to the particular embodiment disclosed as the best mode contemplated for carrying out this invention, but that the invention will include all embodiments falling within the scope of the appended claims.

We claim:

1. Apparatus for digging a trench comprising:
    a base support movable along a trench line, said base support including a pair of longitudinally spaced, sleeve members having a hollow interior and an open end, and a pair of longitudinally spaced slider members each insertable through said open end of one of said frame members and into said hollow interior thereof;
    a first track assembly mounted to each of said sleeve members, and a second track assembly mounted to each of said slider members, said second track assembly having a greater width than said first track assembly;
    at least one cylinder connected between said first and second track assemblies for moving said slider members along said sleeve members so that said second track assembly moves between an extended position and a retracted position relative to said first track assembly;
    a digger arm for digging a trench along said trench line;
    means for mounting said digger arm to said base support.

2. Apparatus for digging a trench, comprising:
    a base support having opposed sides;
    a digger arm for digging a trench along a trench line;
    means for mounting said digger arm to said base support;
    a first track assembly mounted on a side of said base support closest to the trench line, and a second track assembly mounted to the opposite side of said base support, said first track assembly having a greater width than said second track assembly to provide an expanded load bearing surface closest to the trench formed by said digger arm.

3. The apparatus of claim 2 in which said first track assembly is about 36 inches in width, and said second track assembly is about 20 inches in width.

4. Apparatus for digging a trench, comprising:
    a base support having opposed sides;
    a digger arm for digging a trench along a trench line;
    means for mounting said digger arm to said base support;
    a first track assembly mounted on a side of said base support closest to the trench line, and a second track assembly mounted to the opposite side of said base support which is laterally spaced from said first track assembly, said first track assembly having a greater width than said second track assembly to provide an expanded load bearing surface closest to the trench formed by said digger arm;
    adjustment means for adjusting the lateral spacing between said first track assembly and said second track assembly.

5. The apparatus of claim 4 in which said base support includes:
    at least one sleeve member connected to said first track assembly, said sleeve member having a hollow interior;
    at least one slider member connected to said second track assembly and movable within said hollow interior of said sleeve member.

6. The apparatus of claim 5 in which at least one of said hollow interior of said sleeve member and the exterior surface of said slider member mounts a wear plate to permit relative movement of said slider member and sleeve member.

7. The apparatus of claim 5 in which said adjustment means comprises at least one cylinder connected between said first track assembly and said second track assembly, said cylinder being operative to move said second track assembly between an extended position and a retracted position relative to said first track assembly.

8. The apparatus of claim 5 in which said at least one sleeve member comprises two rectangular-shaped, longitudinally spaced sleeve members, each of said sleeve members having one end mounted to said first track assembly and an opposite open end.

9. The apparatus of claim 8 in which said at least one slider member comprises two rectangular-shaped, longitudinally spaced slider members, each of said slider members being mounted at one end to said second track assembly and being insertable through said open end of one of said sleeve members.

* * * * *